(12) United States Patent
Rollinger et al.

(10) Patent No.: US 11,300,091 B2
(45) Date of Patent: Apr. 12, 2022

(54) METHODS AND SYSTEM FOR INHIBITING AUTOMATIC ENGINE STOPPING

(71) Applicant: Ford Global Technologies, LLC, Dearborn, MI (US)

(72) Inventors: John Eric Rollinger, Troy, MI (US); Jeffrey Allen Doering, Canton, MI (US); Jason Meyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/983,213

(22) Filed: Aug. 3, 2020

(65) Prior Publication Data
US 2022/0034288 A1   Feb. 3, 2022

(51) Int. Cl.
| F02D 41/04 | (2006.01) |
| F02N 11/08 | (2006.01) |
| F02D 33/00 | (2006.01) |
| G07C 5/02 | (2006.01) |
| F02D 41/06 | (2006.01) |

(52) U.S. Cl.
CPC ........ F02N 11/0811 (2013.01); F02D 33/006 (2013.01); F02D 41/042 (2013.01); F02D 41/062 (2013.01); G07C 5/02 (2013.01); F02N 2200/02 (2013.01); F02N 2200/061 (2013.01); F02N 2200/0801 (2013.01); F02N 2200/102 (2013.01)

(58) Field of Classification Search
CPC ...... F02N 11/08; F02N 11/0811; F02D 31/00; F02D 31/002; F02D 31/007; F02D 41/067; G07C 5/02

USPC .............. 701/113, 114; 123/198 D, 198 DB, 123/198 DC
See application file for complete search history.

(56) References Cited

U.S. PATENT DOCUMENTS

| 5,743,826 | A | * | 4/1998 | Usuki | ..................... F16H 61/08 |
| | | | | | 477/120 |
| 7,099,768 | B2 | | 8/2006 | Moriya | |
| 10,252,712 | B2 | | 4/2019 | Ossareh et al. | |
| 10,315,647 | B2 | | 6/2019 | Kim | |
| 2009/0030595 | A1 | * | 1/2009 | Sugai | ........................ B60L 7/26 |
| | | | | | 701/112 |
| 2014/0019021 | A1 | * | 1/2014 | Yanagida | ............ B60W 10/107 |
| | | | | | 701/54 |
| 2016/0009271 | A1 | | 1/2016 | Choi et al. | |
| 2016/0311437 | A1 | * | 10/2016 | Tabuchi | .................. B60T 7/122 |
| 2017/0080923 | A1 | * | 3/2017 | Johri | ..................... B60K 6/547 |

FOREIGN PATENT DOCUMENTS

| EP | 1077328 A | 2/2001 |
| JP | H06200791 A | 7/1994 |

* cited by examiner

Primary Examiner — John Kwon
Assistant Examiner — Johnny H Hoang
(74) Attorney, Agent, or Firm — David Kelley; McCoy Russell LLP

(57) ABSTRACT

A method and system for operating a vehicle that includes a plurality of engine starting devices and an internal combustion engine is described. In one example, the method determines whether or not to inhibit automatic engine stopping so that a lifespan of an engine starting device may be extended. In one example, the inhibiting is based on a ratio of an actual total number of engine starts generated via the engine starting device to an actual total distance traveled by the vehicle since the engine starting device was installed.

5 Claims, 5 Drawing Sheets

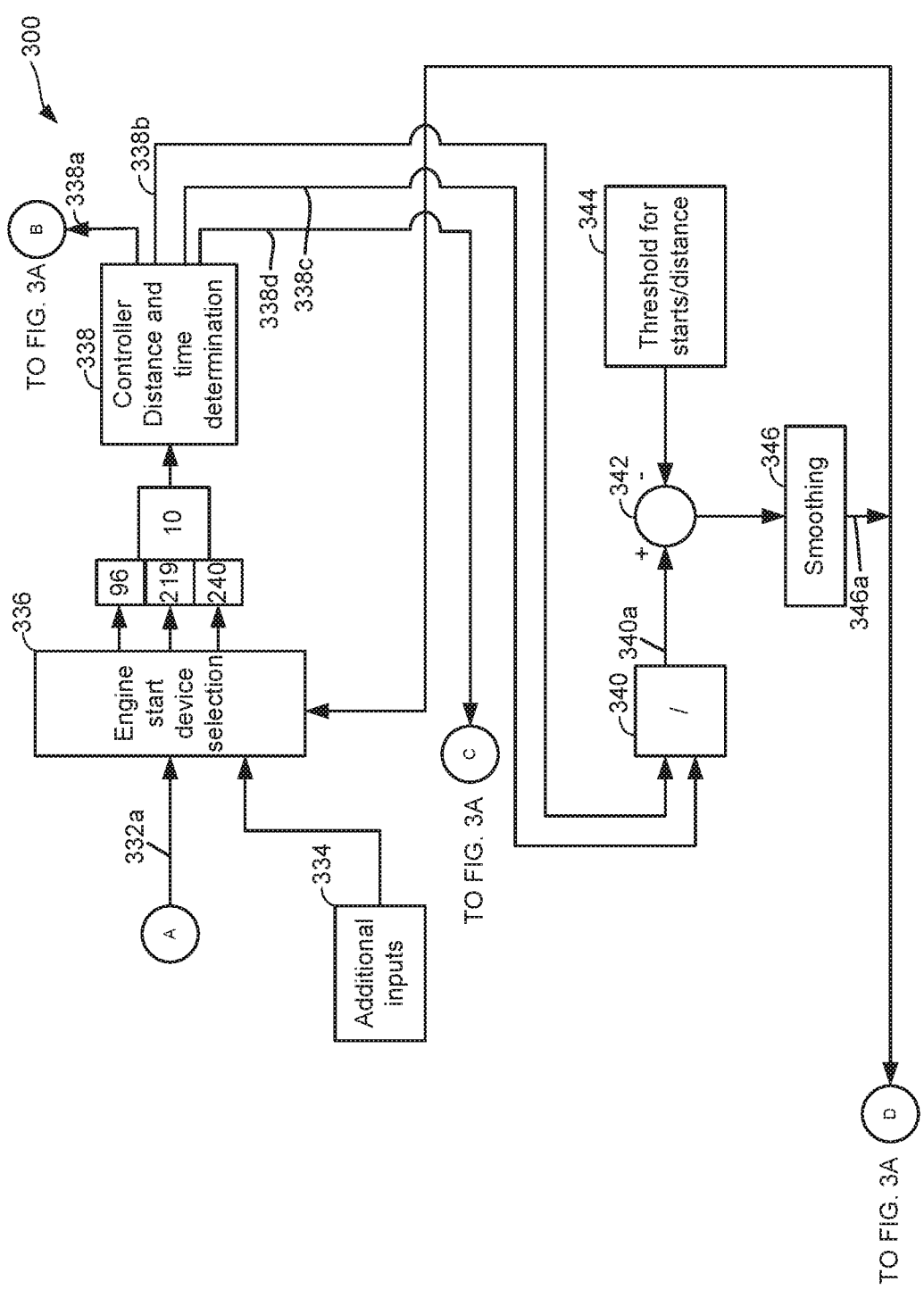

METHODS AND SYSTEM FOR INHIBITING AUTOMATIC ENGINE STOPPING

FIELD

The present description relates to methods and a system for determining inhibiting of automatic engine pull-downs. The methods and systems may be suitable for vehicles that include more than one engine starting device.

BACKGROUND AND SUMMARY

An engine of a vehicle may be pulled-down (e.g., engine rotational speed reduced to zero and no combustion within the engine) to conserve fuel during driving of the vehicle. The engine may be pulled-up or started after the pull-down to provide propulsive force so that vehicle occupants may reach their intended destination. However, if an engine starting device is applied to start the engine more than may be expected, the vehicle may have to be serviced sooner than may be expected.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A and 3B show an example block diagram of a method for determining availability of an engine starting device to start the engine.

DETAILED DESCRIPTION

Figure 2:
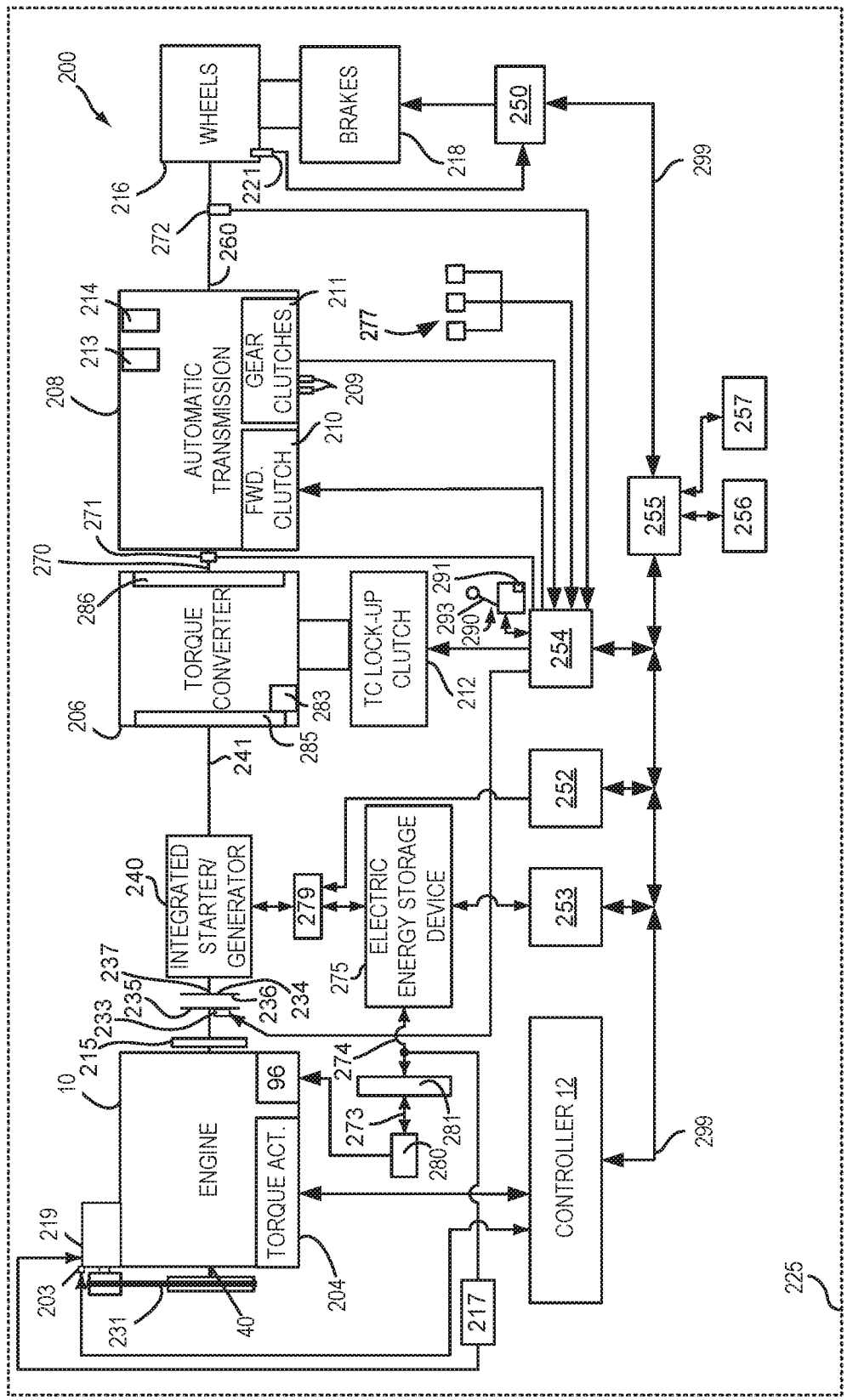
FIG. 2 shows a schematic diagram of an example vehicle driveline or powertrain including the internal combustion engine shown in FIG. 1.
Figure 3A:
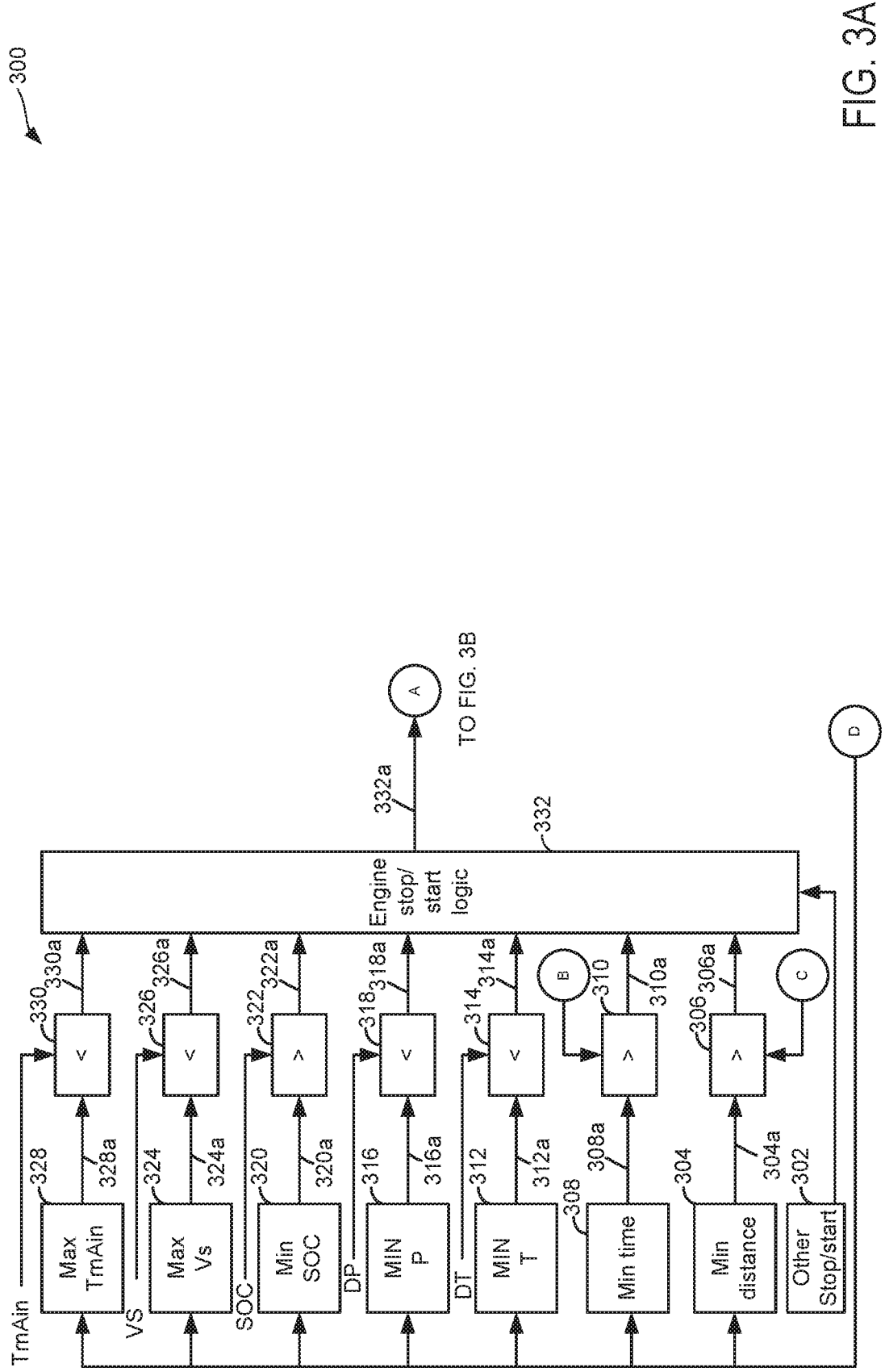
Figure 4:
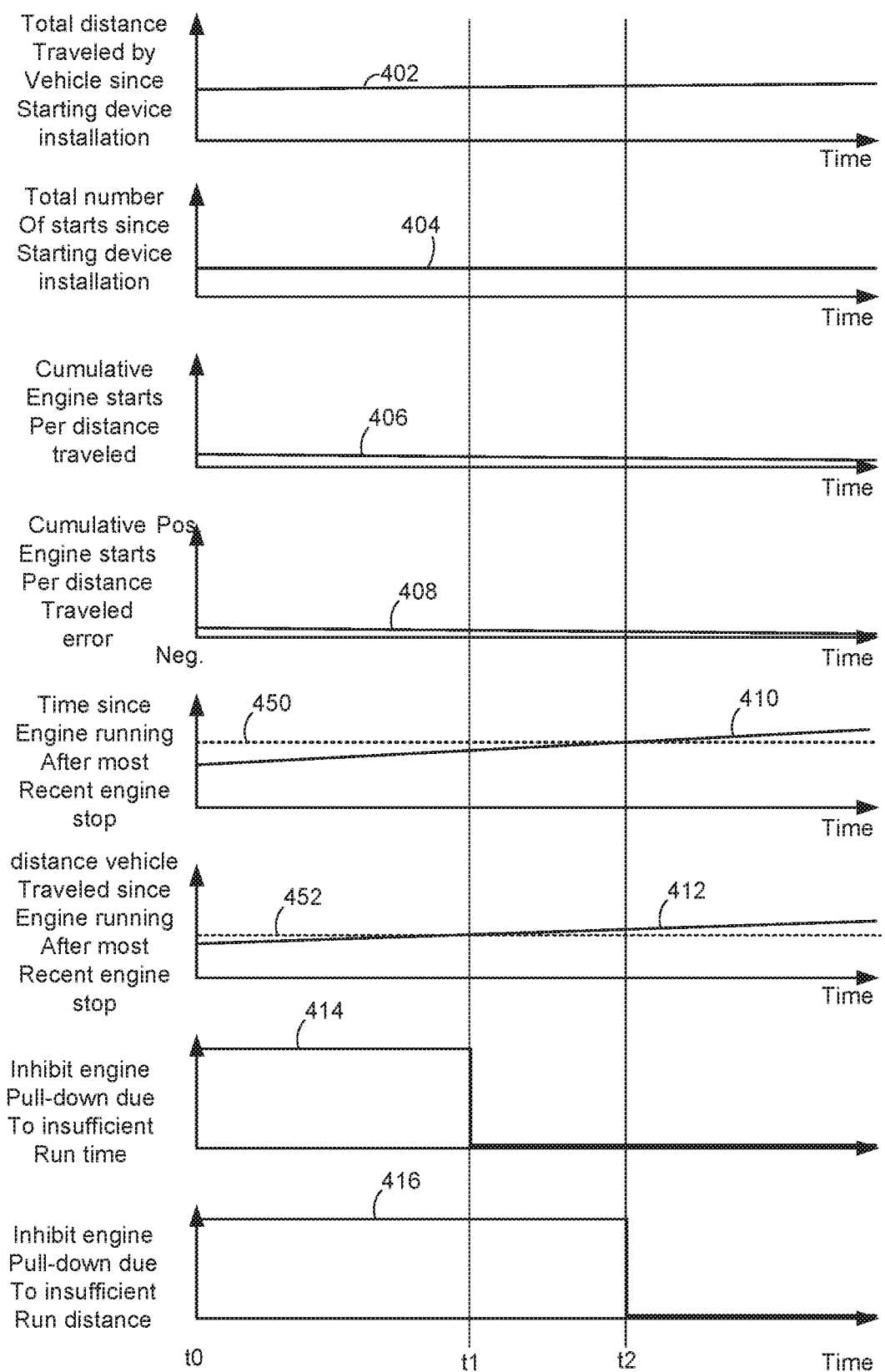
FIG. 4 shows an example vehicle operating sequence according to the method of FIG. 4.

The present description is related to controlling inhibiting of engine pull-down to ensure that an engine starting device may be operational for its expected lifespan. The inhibiting of engine pull-down may be applied to an engine of the type shown in FIG. 1. The engine may be included in a driveline as shown in FIG. 2. The driveline may include more than one engine starting device. In one example, a conventional starter and a belt integrated starter/generator (BISG) are included in a driveline for starting an engine. Inhibiting of engine pull-down may be based on operating characteristics of an engine starting device including distance traveled by a vehicle and a cumulative total number of engine starts since a starting device was installed in the vehicle. The inhibiting of engine pull-down may be determined as shown in the block diagram of FIGS. 3A and 3B. An example vehicle operating sequence according to the method of FIGS. 3A and 3B is shown in FIG. 4.

An engine of a vehicle that has been pulled-down to zero speed such that the engine's rotational speed is stopped may help to conserve fuel during a vehicle drive cycle. After the engine pull-down, the engine may be restarted by one of a plurality of engine starting devices that may be included with a vehicle. However, if one of the plurality of engine starting devices is used to start the engine more frequently than may be expected, the one engine starting device may exhibit a shorter lifespan (often described in terms of distance travelled) than may be expected. Consequently, the vehicle may need to be serviced sooner than may be expected or desired.

The inventors herein have recognized the above-mentioned issues and have developed a method for operating a vehicle, comprising: inhibiting an automatic engine pull-down via a controller based on a minimum engine running time for enabling automatic engine pull-down and based on a minimum vehicle travel distance for enabling automatic engine pull-down.

By inhibiting engine pull-down based on a minimum engine running time for enabling automatic engine pull-down and based on a minimum vehicle travel distance for enabling automatic engine pull-down, it may be possible to control an actual total number of engine starts generated via an engine starting device over a distanced travelled by the vehicle. In particular, if an error based on a ratio of an actual total number of engine starts since installation of an engine starting device into a vehicle to an actual total distance traveled by a vehicle since installation of the engine starting device is positive, then a minimum engine run time to enable engine pull-down may be increased so that fewer automatic engine stops and starts may be generated. Conversely, if the error based on the ratio of the actual total number of engine starts since installation of the engine starting device into the vehicle to the actual total distance traveled by the vehicle since installation of the engine starting device is negative, then a minimum engine run time to enable engine pull-down may be decreased so that additional automatic engine stops and starts may be generated to conserve fuel.

The present description may provide several advantages. Specifically, the approach may adjust automatic engine pull-ups and pull-downs such that an engine starting device may reach a desired lifespan or duration relative to vehicle distance travelled. Further, the approach may respond to an actual total number of engine starts that may be generated via a particular engine starting device and an actual total distance that a vehicle has traveled since the engine starting device was installed in a vehicle so that the engine starting device lifespan may reach vehicle distance criteria and a number of engine starts criteria. In addition, the approach may reduce a possibility of the engine starting device being replaced sooner than may be expected.

The above advantages and other advantages, and features of the present description will be readily apparent from the following Detailed Description when taken alone or in connection with the accompanying drawings.

Figure 1:
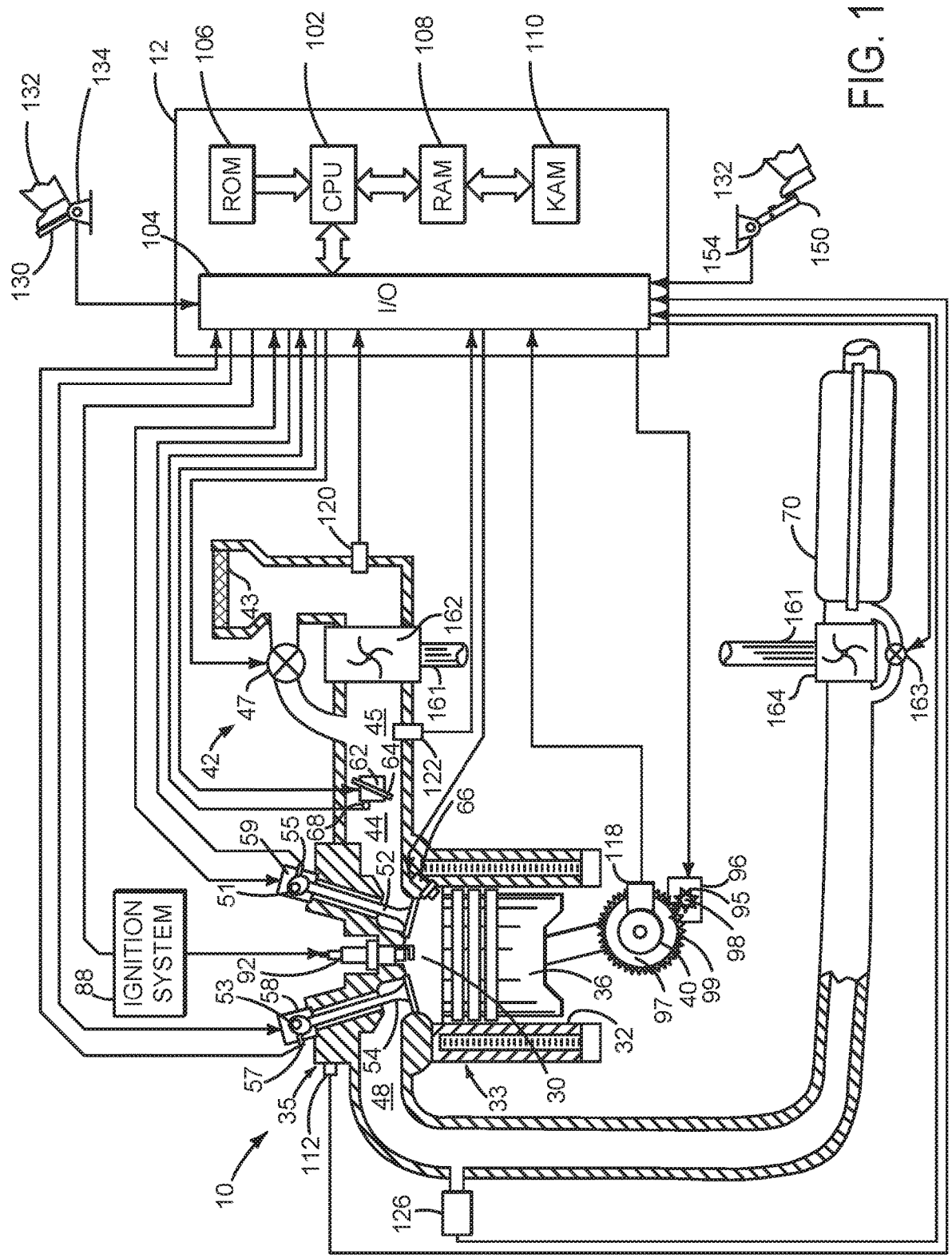
FIG. 1 shows a schematic diagram of an internal combustion engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain.

In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A lift amount and/or a phase or position of intake valve 52 may be adjusted relative to a position of crankshaft 40 via valve adjustment device 59. A lift amount and/or a phase or position of exhaust valve 54 may be adjusted relative to a position of crankshaft 40 via valve adjustment device 58. Valve adjustment devices 58 and 59 may be electro-mechanical devices, hydraulic devices, or mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to an propulsion pedal 130 for sensing force applied by human foot 132; a position sensor 154 coupled to brake pedal 150 for sensing force applied by foot 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an propulsion pedal and vehicle speed, vehicle system controller 255 may request a desired wheel power or a wheel power level to provide a desired rate of vehicle speed change. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240 (e.g., ISG). In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG windings may be determined via BISG winding temperature sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231 and BISG 219 may be referred to as an electric machine, motor, or generator. BISG 219 may be coupled to crankshaft 40 or a camshaft (e.g., 51 or 53 of FIG. 1). BISG 219 may operate as a motor when supplied with electrical power via high voltage bus 274 via inverter 217. Inverter 217 converts direct current (DC) power from high voltage bus 274 to alternating current (AC) and vice-versa so that power may be exchanged between BISG 219 and electric energy storage device 275. Thus, BISG 219 may operate as a generator supplying electrical power to high voltage electric energy storage device (e.g., battery) 275 and/or low voltage bus 273. Bi-directional DC/DC converter 281 may transfer electrical energy from a high voltage buss 274 to a low voltage bus 273 or vice-versa. Low voltage battery 280 is electrically directly coupled to low voltage bus 273. Low voltage bus 273 may be comprised of one or more electrical conductors. Electric energy storage device 275 is electrically coupled to high voltage bus 274. Low voltage battery 280 may selectively supply electrical energy to starter motor 96.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may convert AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC 212 is locked. TCC 212 is electrically operated by controller 254. Alternatively, TCC may be hydraulically locked. In one example, the torque converter 206 may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be transferred to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information.

In response to a request to increase speed of vehicle 225, vehicle system controller may obtain a driver demand power or power request from an propulsion pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel torque limit of 50 N-m, ISG power is adjusted to provide less than 50 N-m (e.g., 49 N-m) of negative torque at the wheels, including compensating for transmission gearing.

The system of FIGS. 1 and 2 provides for a vehicle system, comprising: an internal combustion engine; a plurality of engine starting devices; and a controller including executable instructions stored in non-transitory memory that cause the controller to inhibit automatic stopping of the internal combustion engine based on a ratio of an actual total number of engine starts generated via an engine starting device and an actual total distance traveled by a vehicle since the engine starting device was installed in the vehicle. The vehicle system includes where the actual total number of engine starts generated by the engine starting device begin when the engine starting device was installed in the vehicle. The vehicle system further comprises additional instructions to generate an error from the ratio of the actual total number of engine starts generated via the engine starting device and the actual total distance traveled by the vehicle since the engine starting device was installed in the vehicle. The vehicle system further comprises additional instructions to integrate the error. The vehicle system further comprises additional instructions to rate limit the error. The vehicle system further comprises additional instructions to low pass filter the error. The vehicle system further comprises additional instructions to start the internal combustion engine via one of the plurality of engine starting devices. The vehicle system further comprises additional instructions to determine a total number of engine starts generated via one of the plurality of engine starting devices since the one of the plurality of engine starting devices was installed in the vehicle.

Referring now to FIGS. 3A and 3B, a block diagram 300 of a method to control inhibiting of automatic engine stopping (e.g., an engine stop that is requested via a controller without input via a human to a dedicated device that has a sole purpose of starting/stopping an engine, such as a key switch, pushbutton, or display) based, at least in part, on operating conditions of an engine starting device is shown. Since block diagram 300 controls automatic engine stopping, it also controls whether or not an engine may be automatically restarted. For example, if block diagram 300 prevents automatic engine stopping, it prevents automatic engine starting since the engine may not be automatically started without being automatically stopped. The block diagram may be implemented as executable instructions in one or more of the controllers shown in FIGS. 1 and 2. Herein, block diagram 300 is described according to block 300 being based on a starting device that is a BISG. However, the method of block diagram 300 may be applied to a conventional starter (e.g., 96 of FIG. 1) and/or an ISG (e.g., 240 of FIG. 2). In addition, similar block diagrams for describing control of inhibiting automatic engine stopping based on other engine starting devices may be generated. At least portions of block diagram 300 may be implemented as executable controller instructions stored in non-transitory memory. In addition, block diagram 300 may operate in cooperation with the system of FIGS. 1 and 2. Further, at least portions of the method described by block diagram 300 may be actions taken via a controller in the physical world to transform an operating state of an actuator or device.

Block 338 represents the vehicle powertrain control system (e.g., controllers, sensors, and actuators shown in FIG. 2) and the vehicle powertrain control system determines an amount of time since the engine was most recently running (e.g., rotating and combusting fuel) and outputs the amount of time at output 318a. For example, if an engine is started at time t0, the present time is t1, and the amount of time between t0 and time t1 is two minutes, then block 338 outputs a value of two minutes at output 338a, which is input to block 310. Block 338 also outputs an actual total number of engine starts since the engine starting device (BISG) was installed in the vehicle. For example, if the BISG was installed at time of vehicle manufacture and the engine has started a total of 1000 times since the BISG was installed in the vehicle, then block 338 outputs a value of 1000 at output 338b. Thus, the actual total number of engine starts begins with the first engine start generated by the engine starting device immediately following installation of the engine starting device into the vehicle. Block 338 also outputs a total distance that the vehicle (e.g., vehicle 225 of FIG. 2) has traveled since the engine starting device (BISG) was installed in the vehicle. For example, if the BISG was installed at time of vehicle manufacture and the vehicle has traveled an actual total of 10,000 kilometers since the BISG was installed in the vehicle, then block 338 outputs a value of 10,000 kilometers at output 338c. Block 338 also outputs a distance traveled by the vehicle since the engine was most recently started and began running continuously (e.g., without stopping). For example, if the engine started running most recently with a total distance traveled since vehicle manufacture of 20,000 kilometers and the vehicle's present distance traveled is 20,100 kilometers with no engine stopping (e.g., no stopping of engine rotation) between the 20,000 kilometers and the 20,100 kilometers, then block 338 outputs a value of 100 kilometers at output 338d.

Block 340 receives the output of 338b and 338c and it outputs a cumulative actual total number of engine starts per unit distance traveled by the vehicle since the engine starting device (BISG) was installed in the vehicle at output 340a. Block 340 arrives at the cumulative actual total number of engine starts per unit distance by dividing the actual total number of engine starts since the engine starting device (BISG) was installed in the vehicle by the total distance that the vehicle has traveled since the engine starting device (BISG) was installed in the vehicle. The output 340a is input to summing junction 342.

At summing junction 342, a predetermined threshold actual total number of engine starts per unit distance traveled by the vehicle since the engine starting device was installed in the vehicle from block 344 is subtracted from the cumulative actual total number of engine starts per unit distance traveled by the vehicle since the engine starting device (BISG) was installed in the vehicle. Summing junction 342 outputs an error of the cumulative actual total number of engine starts per unit distance traveled by the vehicle since the engine starting device (BISG) was installed in the vehicle to block 346. The predetermined threshold actual total number of engine starts per unit distance traveled by the vehicle since the engine starting device was installed in the vehicle may be based on a desired level of durability for the engine starting device (BISG).

Block 346 smooths the output of summing junction 342. In one example, block 346 may integrate the output of summing junction 342. In another example, block 346 may low pass filter output of summing junction 342 via a first order low pass filter. In still another example, block 346 may rate limit output of summing junction 342. For example, block 346 may only allow a maximum rate of change of 0.5 engine starts per kilometer traveled. Block 346 outputs a smoothed output of summing junction 342 at output 346a to blocks 302, 304, 308, 312, 316, and 320.

At block 302, block diagram 300 outputs other requests for engine pull-ups (e.g., engine starts) and engine pull-downs. For example, an automatic engine pull-down request may be generated when a vehicle is not moving for a threshold amount of time and the vehicle's brake pedal is applied. Further, an engine pull-down request may be generated when a human vehicle operator specifically requests an engine stop via a dedicated input that has a sole function of requesting engine stops and starts (e.g., a pushbutton, key switch, or display panel). Block 302 outputs other engine pull-up and pull-down requests at output 302a to block 332.

At block 304, block diagram 300 determines a minimum vehicle travel distance for continuous engine operation or running for enabling automatic engine pull-down. For example, block 304 may output a value of 10 kilometers when the smoothed error output of block 346 is a value of 0.5 engine starts/kilometer distance traveled by the vehicle. In one example, block diagram 300 indexes or references a table or function that outputs a minimum vehicle travel distance with continuous engine operation for enabling automatic engine pull-down via the smoothed output of block 346 (e.g., smoothed error of cumulative engine starts per unit distance traveled). The values in the table or function may be empirically determined via operating a vehicle and assessing a level of engine starting device degradation as a function of distance traveled by the vehicle. Thus, block 304 outputs an amount of distance at output 304a. In one example, if the cumulative engine starts per unit distance traveled error has a positive sign, the output of block 304 increases the minimum distance that the vehicle travels with continuous engine operation before automatic engine pull-down is permitted. Conversely, if the cumulative engine starts per unit distance traveled error has a negative sign, the output of block 304 decreases the minimum distance that the vehicle travels with continuous engine operation (e.g., rotating and combusting fuel) before automatic engine pull-down is permitted.

At block 306, block diagram 300 determines if the distance output by block 304 is greater than the time output by block 338. In other words, block 306 judges if the minimum distance that the vehicle traveled before engine pull-down is permitted is greater than the distance the vehicle has traveled since the most recent engine start. If block 306 judges that the minimum distance of vehicle travel before engine pull-down is permitted is greater than the distance the vehicle has traveled since the most recent engine start the time, then the answer is true and block 306 outputs a logical TRUE value at output 306a to block 332. If block 306 judges that the distance that is output by block 304 is not greater than the output 338d, then the answer is FALSE and block 306 outputs a logical FALSE value at output 306a to block 332.

At block 308, block diagram 300 determines a minimum amount of time of continuous engine operation (e.g., rotating and combusting fuel) or engine running time for enabling automatic engine pull-down. For example, block 308 may output a value of 10 minutes when the smoothed error output of block 346 is a value of 0.5 engine starts/kilometer distance traveled by the vehicle. In one example, block diagram 300 indexes or references a table or function that outputs a minimum amount of time of continuous engine operation for enabling automatic engine pull-down via the smoothed output of block 346 (e.g., smoothed error of cumulative engine starts per unit distance traveled). The values in the table or function may be empirically determined via operating a vehicle and assessing a level of engine starting device degradation as a function of continuous engine operation. Thus, block 308 outputs an amount of time at output 308a to block 310. In one example, if the cumulative engine starts per unit distance traveled error (346a) has a positive sign, the output of block 308 increases the minimum amount of time of continuous engine operation before automatic engine pull-down is permitted via calibratable function of the error (346a). Conversely, if the cumulative engine starts per unit distance traveled error (346a) has a negative sign, the output of block 308 decreases the minimum amount of time of continuous engine operation (e.g., rotating and combusting fuel) in a calibratable (e.g., adjustable via functions stored in controller memory) manner before automatic engine pull-down is permitted.

At block 310, block diagram 300 determines if the time output by block 308 is greater than the time output by block 338. In other words, block 310 judges if the minimum time of continuous engine running is greater than the amount of time the engine has continuously been running since the most recent engine start. If block 310 judges that the time that is output by block 308 is greater than the output 338a, then the answer is true and block 310 outputs a logical TRUE value at output 310a to block 332. If block 310 judges that the time that is output by block 308 is not greater than the output 338a, then the answer is FALSE and block 310 outputs a logical FALSE value at output 310a to block 332.

At block 312, block diagram 300 determines a minimum driver demand torque (e.g., a wheel torque) to enable automatic engine pull-down. For example, block 312 may output a value of 100 Newton-meters when the smoothed error output of block 346 is a value of 0.5 engine starts/kilometer distance traveled by the vehicle. In one example, block diagram 300 indexes or references a table or function that outputs a minimum driver demand torque for enabling automatic engine pull-down via the smoothed output of block 346 (e.g., smoothed error of cumulative engine starts per unit distance traveled). The values in the table or function may be empirically determined via operating a vehicle and assessing a level of engine starting device degradation as a function of minimum driver demand torque. Thus, block 312 outputs a minimum driver demand torque at output 312a. In one example, if the cumulative engine starts per unit distance traveled error has a positive sign, the output of block 312 decreases the minimum driver demand torque at which automatic engine pull-down is permitted. Conversely, if the cumulative engine starts per unit distance traveled error has a negative sign, the output of block 312 increases the minimum driver demand torque at which automatic engine pull-down is permitted.

At block 314, block diagram 300 determines if the minimum driver demand torque output by block 312 is less than the driver demand torque (DT). In other words, block 314 judges if the minimum driver demand torque at which engine pull-down is permitted is less than the present driver demand torque. If block 314 judges that the minimum driver demand torque is less than the present driver demand torque, the answer is TRUE and block 314 outputs a logical TRUE value at output 314a to block 332. If block 314 judges that the minimum driver demand torque is not less than the present driver demand torque, the answer is FALSE and block 314 outputs a logical FALSE value at output 314a to block 332. It should be noted that hysteresis may be incorporated into this comparison so that jitter or rapid state changing of the output may be avoided.

At block 316, block diagram 300 determines a minimum driver demand power (e.g., a wheel power) to enable automatic engine pull-down. For example, block 316 may output a value of 1000 Kilowatts when the smoothed error output of block 346 is a value of 0.5 engine starts/kilometer distance traveled by the vehicle. In one example, block diagram 300 indexes or references a table or function that outputs a minimum driver demand power for enabling automatic engine pull-down via the smoothed output of block 346 (e.g., smoothed error of cumulative engine starts per unit distance traveled). The values in the table or function may be empirically determined via operating a vehicle and assessing a level of engine starting device degradation as a function of minimum driver demand power. Thus, block 316 outputs a minimum driver demand power at output 316*a*. In one example, if the cumulative engine starts per unit distance traveled error has a positive sign, the output of block 316 decreases the minimum driver demand power at which automatic engine pull-down is permitted. Conversely, if the cumulative engine starts per unit distance traveled error has a negative sign, the output of block 316 increases the minimum driver demand power at which automatic engine pull-down is permitted.

At block 318, block diagram 300 determines if the minimum driver demand power output by block 316 is less than the driver demand power (DP). In other words, block 318 judges if the minimum driver demand power at which engine pull-down is permitted is less than the present driver demand power. If block 318 judges that the minimum driver demand power is less than the present driver demand power, the answer is TRUE and block 318 outputs a logical TRUE value at output 318*a* to block 332. If block 318 judges that the minimum driver demand torque is not less than the present driver demand torque, the answer is FALSE and block 318 outputs a logical FALSE value at output 318*a* to block 332. It should be noted that hysteresis may be incorporated into this comparison so that jitter or rapid state changing of the output may be avoided.

At block 320, block diagram 300 determines a minimum battery state of charge (SOC) to enable automatic engine pull-down. For example, block 320 may output a value of 75% when the smoothed error output of block 346 is a value of 0.5 engine starts/kilometer distance traveled by the vehicle. In one example, block diagram 300 indexes or references a table or function that outputs a minimum SOC for enabling automatic engine pull-down via the smoothed output of block 346 (e.g., smoothed error of cumulative engine starts per unit distance traveled). The values in the table or function may be empirically determined via operating a vehicle and assessing a level of engine starting device degradation as a function of SOC at which automatic engine stop is permitted. Thus, block 320 outputs a SOC at output 320*a*. In one example, if the cumulative engine starts per unit distance traveled error has a positive sign, the output of block 320 increases the SOC at which automatic engine pull-down is permitted. Conversely, if the cumulative engine starts per unit distance traveled error has a negative sign, the output of block 320 decreases the SOC at which automatic engine pull-down is permitted.

At block 322, block diagram 300 determines if the minimum SOC output by block 320 is less than the present SOC. In other words, block 322 judges if the minimum SOC at which engine pull-down is permitted is greater than the present SOC. If block 322 judges that the minimum SOC is greater than the present SOC, the answer is TRUE and block 322 outputs a logical TRUE value at output 322*a* to block 332. If block 322 judges that the minimum SOC is not less than the present SOC, the answer is FALSE and block 322 outputs a logical FALSE value at output 314*a* to block 332. It should be noted that hysteresis may be incorporated into this comparison so that jitter or rapid state changing of the output may be avoided.

At block 324, block diagram 300 determines a maximum vehicle speed to enable automatic engine pull-down. For example, block 312 may output a value of 100 kilometers/hour. In one example, block diagram 300 indexes or references a table or function that outputs a maximum vehicle speed to enable automatic engine pull-down via the smoothed output of block 346 (e.g., smoothed error of cumulative engine starts per unit distance traveled). The values in the memory location may be empirically determined via operating a vehicle and assessing a level of engine starting device degradation as a function of maximum vehicle speed. Thus, block 324 outputs a maximum vehicle speed.

At block 326, block diagram 300 determines if the maximum vehicle speed output by block 324 is less than the present vehicle speed (VS). In other words, block 326 judges if the maximum vehicle speed at which engine pull-down is permitted is less than the present vehicle speed. If block 326 judges that the maximum vehicle speed is less than the present vehicle speed, the answer is TRUE and block 326 outputs a logical TRUE value at output 326*a* to block 332. If block 326 judges that the maximum vehicle speed is not less than the present vehicle speed, the answer is FALSE and block 326 outputs a logical FALSE value at output 326*a* to block 332. It should be noted that hysteresis may be incorporated into this comparison so that jitter or rapid state changing of the output may be avoided.

At block 328, block diagram 300 determines a maximum transmission assembly input speed (e.g., input shaft speed) to enable automatic engine pull-down. For example, block 328 may output a value of 3000 RPM. In one example, block diagram 300 indexes or references a table or function that outputs a maximum transmission assembly input speed for enabling automatic engine pull-down via the smoothed output of block 346 (e.g., smoothed error of cumulative engine starts per unit distance traveled). The values in the memory location may be empirically determined via operating a vehicle and assessing a level of engine starting device degradation as a function of maximum vehicle speed. Thus, block 328 outputs a maximum transmission input shaft speed.

At block 330, block diagram 300 determines if the maximum transmission input shaft speed output by block 328 is less than the present transmission input shaft speed (TrnAin). In other words, block 330 judges if the maximum transmission input shaft speed at which engine pull-down is permitted is less than the present transmission input shaft speed. If block 330 judges that the maximum transmission input shaft speed is less than the transmission input shaft speed, the answer is TRUE and block 330 outputs a logical TRUE value at output 330*a* to block 332. If block 330 judges that the maximum transmission input shaft speed is not less than the present transmission input shaft speed, the answer is FALSE and block 330 outputs a logical FALSE value at output 330*a* to block 332. It should be noted that hysteresis may be incorporated into this comparison so that jitter or rapid state changing of the output may be avoided.

At block 332, block diagram 300 applies engine stop/start or pull-down/pull-up logic to determine whether the desired engine state is on (e.g., rotating and combusting fuel) or off (e.g., not rotating and not combusting fuel). In one example, block 312 determines the desired engine state according to input from block 302, block 306, block 310, block 314, block 318, block 322, block 326, and block 330. In one example, if any of the pull-down inhibit signals is logically TRUE, the engine pull-down is inhibited. For example, if block 302 outputs an engine pull-down request that is based on vehicle speed being zero while the vehicle's brake pedal is applied and one of blocks 306 and 310 outputs a logical TRUE value, then engine pull-down is inhibited. However, if block 302 outputs an engine pull-down request that is based on vehicle speed being zero while the vehicle's brake pedal is applied and blocks 306 and 310 output logical FALSE values, then engine pull-down is not inhibited. Block 332 outputs the requested engine state at output 332a.

At block 336, block diagram 300 determines which engine starting device is to be applied to start the engine if the desired engine state is on. Block 336 judges which engine starting device is to be applied to start the engine based on inputs from block 334. Block 334 provides vehicle operating conditions to block 336. For example, block 334 may output engine oil temperature, ambient temperature, and engine cylinder head temperature to block 336. Block 336 may select starter 96 of FIG. 1 to start the engine when these three temperatures are each below 5° C. On the other hand, block 336 may select BISG 219 to start the engine when engine oil temperature and cylinder head temperature are greater than 20° C. Further, block 336 may select ISG 240 to start the engine when BISG 219 is degraded. Block 336 commands one of engine starting device 96, 219, or 240 to start the engine when an engine start is requested. The engine starting device 96, 218, or 240 that has been commanded to start the engine rotates the engine at a predetermined cranking speed (e.g., 240 RPM). The engine may be started via supplying spark and fuel to the engine's cylinders. Engine operating conditions are provided to the engine control system 318 via the sensors and actuators described herein.

Thus, the method of FIGS. 3A and 3B provides for a method for operating a vehicle, comprising: inhibiting an automatic engine pull-down via a controller based on a minimum engine running time for enabling automatic engine pull-down and based on a minimum vehicle travel distance for enabling automatic engine pull-down. The method further comprises cranking an engine via one of a plurality of engine starting devices. The method includes where inhibiting the automatic engine pull-down is further based on an amount of continuous engine run time since an engine most recently stopped being less than the minimum engine running time for enabling automatic engine pull-down. The method includes where inhibiting the automatic engine pull-down is further based on an actual total distance traveled by a vehicle since an engine began continuously running after the engine most recently stopped being less than the minimum vehicle travel distance for enabling automatic engine pull-down. The method further comprises requesting the automatic engine pull-down in response to vehicle operating conditions. The method includes where the vehicle operating conditions include vehicle speed and brake pedal position. The method includes where the automatic engine pull-down includes ceasing fuel delivery to an engine.

The method of FIGS. 3A and 3B also provides for a method for operating a vehicle, comprising: inhibiting an automatic engine pull-down via a controller based on a minimum engine running time for enabling automatic engine pull-down and based on a minimum vehicle travel distance for enabling automatic engine pull-down, wherein the minimum engine running time for enabling automatic engine pull-down varies as a function of a ratio of an actual total number of engine starts generated via an engine starting device and an actual total distance traveled by a vehicle since the engine starting device was installed in the vehicle. The method includes wherein the minimum vehicle travel distance for enabling automatic engine pull-down varies as a function of the ratio of the actual total number of engine starts generated via an engine starting device and the actual total distance traveled by the vehicle since the engine starting device was installed in the vehicle. The method further comprises automatically starting an engine when the automatic engine pull-down is not inhibited. The method further comprises permitting engine pull-down in response to an operator initiated engine pull-down request. The method includes wherein the actual total number of engine starts generated via the engine starting device begins with an engine start that immediately follows installation of the engine starting device into the vehicle.

Referring now to FIG. 4, an example vehicle operating sequence is shown. The sequence of FIG. 4 may be generated via the system of FIGS. 1 and 2 in cooperation with the method described by the block diagram of FIG. 3. Vertical lines at times t0-t2 represent times of interest during the sequence. The plots in FIG. 4 are time aligned and occur at the same time.

The first plot from the top of FIG. 4 is a plot of the actual total distance traveled by the vehicle since a particular one of the engine starting devices (e.g., the BISG) was installed in the vehicle versus time. The vertical axis represents the total distance traveled by the vehicle since a particular one of the engine starting devices (e.g., the BISG) was installed in the vehicle and the total distance increases in the direction of the vertical axis arrow. The horizontal axis represents time and the amount of time increases from the left side of the plot to the right side of the plot. Trace 402 represents total distance traveled by the vehicle since a particular one of the engine starting devices (e.g., the BISG) was installed in the vehicle.

The second plot from the top of FIG. 4 is a plot of an actual total number of engine starts since the particular engine starting device (e.g., the BISG) was installed in the vehicle. The vertical axis represents the total number of engine starts since a particular one of the engine starting devices (e.g., the BISG) was installed in the vehicle and the number of engine starts since the particular one of the engine starting devices was installed in the vehicle increases in the direction of the vertical axis arrow. Trace 404 represents the total number of engine starts since a particular one of the engine starting devices (e.g., the BISG) was installed in the vehicle. The horizontal axis represents time and time increases from the left side of the plot to the right side of the plot.

The third plot from the top of FIG. 4 is a plot of a cumulative actual total number of engine starts per unit distance traveled (e.g., 0.3 engine starts per kilometer) versus time. The vertical axis represents the cumulative actual total number of engine starts per unit distance traveled and cumulative actual total number of engine starts per unit distance traveled increases in the direction of the vertical axis arrow. Trace 406 represents the cumulative actual total number of engine starts per unit distance traveled by the vehicle. The horizontal axis represents time and time increases from the left side of the plot to the right side of the plot.

The fourth plot from the top of FIG. 4 is a plot of an error of the cumulative actual total number of engine starts per unit distance traveled versus time. The vertical axis represents the error of the cumulative actual total number of engine starts per unit distance traveled and error of the cumulative actual total number of engine starts per unit distance traveled increases in the direction of the vertical axis arrow. Trace 408 represents the error of the cumulative actual total number of engine starts per unit distance traveled by the vehicle. The horizontal axis represents time and time increases from the left side of the plot to the right side of the plot.

The fifth plot from the top of FIG. 4 is a plot of an amount of time that the engine has been continuously been running since the more recent engine stop versus time. The vertical axis represents the amount of time that the engine has been continuously been running since the more recent engine stop and the amount of time that the engine has been continuously been running since the more recent engine stop increases in the direction of the vertical axis arrow. The horizontal axis represents time and time increases from the left side of the plot to the right side of the plot. Trace 410 represents the amount of time that the engine has been continuously been running since the more recent engine stop. Horizontal line 450 represents a minimum engine run time since a most recent engine stop that has to occur before engine pull-down may be enabled.

The sixth plot from the top of FIG. 4 is a plot of a distance that the vehicle has traveled while the engine has been continuously running since the more recent engine stop versus time. The vertical axis represents the distance that the vehicle has traveled while the engine has been continuously running since the more recent engine stop and the distance that the vehicle has traveled while the engine has been continuously been running since the more recent engine stop increases in the direction of the vertical axis arrow. The horizontal axis represents time and time increases from the left side of the plot to the right side of the plot. Trace 412 represents the distance that the vehicle has traveled while the engine has been continuously running since the more recent engine stop. Horizontal line 452 represents a minimum distance that the vehicle has to travel while the engine has been continuously running since the more recent engine stop for automatic engine pull-down to be enabled.

The seventh plot from the top of FIG. 4 is a plot of a state that indicates automatic engine pull-down is inhibited due to insufficient engine running time versus time. The vertical axis represents the state that indicates automatic engine pull-down is inhibited due to insufficient engine running time and the state that indicates that automatic engine pull-down is inhibited due to insufficient engine running time is true when trace 414 is at a higher level near the vertical axis arrow. The state that indicates that automatic engine pull-down is inhibited due to insufficient engine running time is not true when trace 414 is at a lower level near the horizontal axis. The horizontal axis represents time and time increases from the left side of the plot to the right side of the plot. Trace 414 represents the state that indicates automatic engine pull-down is inhibited due to insufficient engine running time.

The eighth plot from the top of FIG. 4 is a plot of a state that indicates automatic engine pull-down is inhibited due to insufficient engine running distance versus time. The vertical axis represents the state that indicates that automatic engine pull-down is inhibited due to insufficient engine running distance and the state that indicates that automatic engine pull-down is inhibited due to insufficient engine running distance is true when trace 416 is at a higher level near the vertical axis arrow. The state that indicates that automatic engine pull-down is inhibited due to insufficient engine running distance is not true when trace 416 is at a lower level near the horizontal axis. The horizontal axis represents time and time increases from the left side of the plot to the right side of the plot. Trace 416 represents the state that indicates that automatic engine pull-down is inhibited due to insufficient engine running distance (e.g., the vehicle and engine have not traveled a sufficient distance to permit automatic engine pull-down).

At time t0, the engine is running and the vehicle is moving (not shown). The total distance traveled by the vehicle since the engine starting device was installed in the vehicle is at middle level and it is increasing gradually. The total number of engine starts since the engine starting device was installed in the vehicle is at a constant level. The cumulative number of engine starts per unit distance traveled (e.g., 0.3 starts/kilometer) is at a lower level and the cumulative number of engine starts per distance traveled error is positive, which indicates that the engine starts per unit distance traveled are greater than a threshold number of engine starts per unit distance traveled. The amount of time since a most recent time that the engine was stopped is increasing and it is less than the minimum engine run time since a most recent engine stop that has to occur or pass to enable automatic engine pull-down. The distance that the vehicle has traveled since the engine most recently began running after a most recent engine stop (e.g., no engine rotation) is increasing and it is less than the minimum distance that the vehicle has to travel while the engine has been continuously running since the most recent engine stop before automatic engine pull-down may be enabled. Automatic engine pull-down due to insufficient engine run time is inhibited. In addition, automatic engine pull-down due to insufficient engine run distance is inhibited.

Between time t0 and time t1, the total distance traveled by the vehicle increases and the total number of engine starts since engine starting device installation remains unchanged. The cumulative number of engine starts per unit distance traveled decreases and the cumulative engine starts per distance traveled error decreases. The amount of time since a most recent time that the engine was stopped is increasing and it is less than the minimum engine run time since a most recent engine stop that has to occur or pass to enable automatic engine pull-down. The distance that the vehicle has traveled since the engine most recently began running after a most recent engine stop (e.g., no engine rotation) is increasing and it is less than the minimum distance that the vehicle has to travel while the engine has been continuously running since the most recent engine stop before automatic engine pull-down may be enabled. Automatic engine pull-down due to insufficient engine run time is inhibited. In addition, automatic engine pull-down due to insufficient engine run distance is inhibited.

At time t1, the amount of time since a most recent time that the engine was stopped is increasing and it is greater than the minimum engine run time since a most recent engine stop that has to occur or pass to enable automatic engine pull-down. The distance that the vehicle has traveled since the engine most recently began running after a most recent engine stop (e.g., no engine rotation) is increasing and it is less than the minimum distance that the vehicle has to travel while the engine has been continuously running since the most recent engine stop before automatic engine pull-down may be enabled. Automatic engine pull-down due to insufficient engine run time is no longer inhibited. The automatic engine pull-down due to insufficient engine run distance is inhibited.

At time t2, the amount of time since a most recent time that the engine was stopped continues to increase and it is greater than the minimum engine run time since a most recent engine stop that has to occur or pass to enable automatic engine pull-down. The distance that the vehicle has traveled since the engine most recently began running after a most recent engine stop (e.g., no engine rotation) is increasing and it is greater than the minimum distance that the vehicle has to travel while the engine has been continuously running since the most recent engine stop before automatic engine pull-down may be enabled. Automatic engine pull-down due to insufficient engine run time is no longer inhibited. The automatic engine pull-down due to insufficient engine run distance is no longer inhibited.

In this way, inhibiting of automatic engine pull-down may be performed based on a distance traveled by a vehicle and an amount of time that an engine has been continuously running. Further, the distance traveled by the vehicle for enabling automatic engine pull-down may be adjusted as a function of an actual total number of engine starts since an engine starting device was installed in a vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
   inhibiting an automatic engine pull-down via a controller based on a minimum engine running time for enabling automatic engine pull-down as determined via the controller and based on a minimum vehicle travel distance for enabling automatic engine pull-down as determined via the controller, wherein the minimum engine running time for enabling automatic engine pull-down varies as a function of a ratio of an actual total number of engine starts generated via an engine starting device as determined via the controller and an actual total distance traveled by a vehicle since the engine starting device was installed in the vehicle as determined via the controller.

2. The method of claim 1, wherein the minimum vehicle travel distance for enabling automatic engine pull-down varies as a function of the ratio of the actual total number of engine starts generated via an engine starting device and the actual total distance traveled by the vehicle since the engine starting device was installed in the vehicle.

3. The method of claim 1, further comprising:
   automatically starting an engine via the controller when the automatic engine pull-down is not inhibited; and
   inhibiting the automatic engine pull-down via the controller based on a minimum torque demand for enabling automatic engine pull-down as determined via the controller, wherein the minimum torque demand for enabling automatic engine pull-down varies as the function of the ratio of the actual total number of engine starts generated via an engine starting device and the actual total distance traveled by the vehicle since the engine starting device was installed in the vehicle.

4. The method of claim 1, further comprises permitting engine pull-down via the controller in response to an operator initiated engine pull-down request; and
   inhibiting the automatic engine pull-down via the controller based on a minimum power demand for enabling automatic engine pull-down as determined via the controller, wherein the minimum power demand for enabling automatic engine pull-down varies as the function of the ratio of an actual total number of engine starts generated via an engine starting device and the actual total distance traveled by the vehicle since the engine starting device was installed in the vehicle;
   inhibiting an automatic engine pull-down via the controller based on a minimum battery state of charge (SOC) for enabling automatic engine pull-down as determined via the controller, wherein the minimum battery state of charge for enabling automatic engine pull-down varies as a function of the ratio of the actual total number of engine starts generated via the engine starting device and the actual total distance traveled by the vehicle since the engine starting device was installed in the vehicle;
   inhibiting the automatic engine pull-down via the controller based on a minimum vehicle speed for enabling automatic engine pull-down as determined via the controller, wherein the minimum vehicle speed for enabling automatic engine pull-down varies as a function of the ratio of the actual total number of engine starts generated via the engine starting device and the actual total distance traveled by the vehicle since the engine starting device was installed in the vehicle; and
   inhibiting the automatic engine pull-down via the controller based on a minimum transmission assembly input (TrnAin) speed for enabling automatic engine pull-down as determined via the controller, wherein the transmission assembly input speed for enabling automatic engine pull-down varies as a function of the ratio of the actual total number of engine starts generated via the engine starting device and the actual total distance traveled by the vehicle since the engine starting device was installed in the vehicle.

5. The method of claim 1, wherein the actual total number of engine starts generated via the engine starting device begins with an engine start that immediately follows installation of the engine starting device into the vehicle as determined via the controller.

* * * * *